United States Patent
Josefsson et al.

(10) Patent No.: US 7,305,037 B2
(45) Date of Patent: Dec. 4, 2007

(54) CALIBRATION SYSTEM FOR A COMMUNICATIONS SYSTEM

(75) Inventors: Olafur Josefsson, North Reading, MA (US); Colm Prendergast, Cambridge, MA (US); James Wilson, Foxboro, MA (US); Daniel T. Boyko, Norwood, MA (US)

(73) Assignee: Analog Devices, Inc., Norwood, MA (US)

( * ) Notice: Subject to any disclaimer, the term of this patent is extended or adjusted under 35 U.S.C. 154(b) by 458 days.

(21) Appl. No.: 09/788,211

(22) Filed: Feb. 16, 2001

(65) Prior Publication Data

US 2001/0031012 A1   Oct. 18, 2001

Related U.S. Application Data

(60) Provisional application No. 60/183,107, filed on Feb. 17, 2000.

(51) Int. Cl.
*H04B 3/00* (2006.01)
*H04L 25/00* (2006.01)

(52) U.S. Cl. .............. 375/257; 375/216; 375/222; 375/220; 375/219; 375/285; 375/296

(58) Field of Classification Search ............... 375/257, 375/216, 219–223, 346, 285, 295, 297; 455/63.1, 455/114.2, 114.3, 296
See application file for complete search history.

(56) References Cited

U.S. PATENT DOCUMENTS

| | | |
|---|---|---|
| 4,387,273 A | 6/1983 | Chea, Jr. |
| 4,539,552 A | 9/1985 | Davis et al. |
| 4,563,547 A | 1/1986 | Booth ................... 179/16 AA |
| 4,748,419 A | 5/1988 | Somerville |
| 4,835,486 A | 5/1989 | Somerville .................... 330/10 |
| 4,843,339 A | 6/1989 | Burt et al. ..................... 330/10 |
| 5,022,024 A | 6/1991 | Paneth et al. ................. 370/50 |
| 5,155,743 A | 10/1992 | Jacobs .......................... 375/28 |
| 5,293,421 A | 3/1994 | Zanzig |
| 5,353,310 A | 10/1994 | Russell et al. ............... 375/101 |
| 5,369,687 A | 11/1994 | Farkas |
| 5,392,218 A | 2/1995 | Emmerich |
| 5,500,894 A | 3/1996 | Hershbarger |
| 5,500,895 A | 3/1996 | Yurgelites ..................... 379/98 |
| 5,537,441 A | 7/1996 | Bremer et al. |
| 5,550,993 A | 8/1996 | Ehlig et al. |
| 5,574,396 A | 11/1996 | Drainville |
| 5,602,912 A | 2/1997 | Hershbarger |
| 5,654,984 A | 8/1997 | Hershbarger et al. ....... 375/257 |

(Continued)

OTHER PUBLICATIONS

Kennedy, "Electronic Communication Systems", published by McGraw-Hill, Inc., 1970, pp. 212 and 213.*

(Continued)

*Primary Examiner*—Phuong Phu
(74) *Attorney, Agent, or Firm*—Iandiorio & Teska (57) ABSTRACT

A calibration system for a communication system is provided featuring a transmitter circuit, a receiver circuit, a transmission medium having a transfer function for transmitting a signal between the transmitter and receiver circuits, and a calibration system responsive to the altered reference signal of the transmitter circuit for adjusting the reference signal level of one of the transmitter and receiver circuits to compensate for variations in the transmission signal due to the transfer function.

43 Claims, 7 Drawing Sheets

U.S. PATENT DOCUMENTS

| | | | |
|---|---|---|---|
| 5,724,363 A | 3/1998 | Breya | 371/5.5 |
| 5,870,046 A | 2/1999 | Scott et al. | 341/143 |
| 5,883,907 A * | 3/1999 | Hoekstra | 714/784 |
| 5,966,297 A | 10/1999 | Minegishi | |
| 6,081,586 A | 6/2000 | Rahamim et al. | 379/93.29 |
| 6,107,948 A | 8/2000 | Scott et al. | 341/143 |
| 6,134,578 A | 10/2000 | Ehlig et al. | |
| 6,137,827 A | 10/2000 | Scott et al. | 375/219 |
| 6,151,335 A | 11/2000 | Ko et al. | 370/487 |
| 6,167,132 A | 12/2000 | Krone et al. | 379/399 |
| 6,184,829 B1 | 2/2001 | Stilp | 342/387 |
| 6,304,594 B1 * | 10/2001 | Salinger | 375/222 |
| 6,415,003 B1 * | 7/2002 | Raghavan | 375/317 |
| 6,434,199 B1 * | 8/2002 | Desrosiers et al. | 375/261 |
| 6,545,785 B1 | 4/2003 | Heflinger et al. | |
| 6,587,560 B1 | 7/2003 | Scott et al. | |
| 2001/0028320 A1 | 10/2001 | Prendergast et al. | |

OTHER PUBLICATIONS

"Signal Isolation Buffer Amplifiers" product brochure, 15 pages, Burr-Brown Corporation, 1987.

* cited by examiner

CALIBRATION SYSTEM FOR A COMMUNICATIONS SYSTEM

RELATED APPLICATIONS

This application claims benefit of U.S. Provisional Application No. 60/183,107 filed on Feb. 17, 2000 entitled "ISOLATED ANALOG COMMUNICATIONS INTERFACE." This application is related to copending U.S. patent application 09/784,827 entitled "ISOLATION SYSTEM WITH ANALOG COMMUNICATION ACROSS AN ISOLATION BARRIER" filed on Feb. 15, 2001.

FIELD OF THE INVENTION

This invention relates to a calibration system for a communications system with analog communication across an isolation barrier.

BACKGROUND OF THE INVENTION

Communications systems with analog communications across an isolation barrier are sensitive to the mismatch of components used to implement the system: the component tolerances do not allow for a predictable transfer function from the transmitter circuits to the receiver circuits. There are also parasitic elements (capacitive and inductive) present in the system which may affect the predictability of the transfer function between transmitters and receivers. Further variance in the transfer function may be introduced by changing environmental conditions to which the communication system is exposed, for example, changes in temperature.

Additionally, there is continued effort to increase the bit rate of communications systems. As the bit rate increases, the sensitivity to the unpredictable gain increases, thereby increasing the possibility of errors in data transmission.

BRIEF SUMMARY OF THE INVENTION

It is therefore an object of this invention to provide a calibration system for a communication system to minimize the likelihood of data transmission errors.

It is a further object of this invention to provide such a calibration system to maximize the bit rate.

It is a further object of this invention to provide such a calibration system to adjust the reference signal level of one of the transmitter and receiver circuits to compensate for variations in the transmission signal due the transfer function of the transmission medium.

It is a further object of this invention to provide such a calibration system which minimizes the clock speed of the system.

It is a further object of this invention to provide such a calibration system which minimizes the cost of the communications systems by reducing the number of components and pins used.

It is a further object of this invention to provide such a calibration system for a bi-directional communication system to provide for local echo cancellation and calibration of the local echo cancellation.

The invention results from the realization that an improved communications system which can compensate for the unpredictable transfer function due to component mismatches and parasitic elements can be achieved with a calibration system which is responsive to an altered reference signal of the transmitter circuit to adjust the reference signal level of at least one of the transmitter and receiver circuits to compensate for variations in the transmission signal due to the transfer function of the transmission medium. The invention also results from the realization that an improved bi-directional communication system can be achieved with a calibration system which is responsive to the local echos of the transmitter circuits to adjust the echo cancellation signals.

This invention features a calibration system for a communication system including a transmitter circuit, a receiver circuit, a transmission medium having a transfer function for transmitting a transmission signal between the transmitter and receiver circuits, and a calibration system responsive to an altered reference signal of the transmitter circuit altered by the transmission medium for adjusting the reference signal level of one of the transmitter and receiver circuits to compensate for variations in the transmission signal due to the transfer function.

In a preferred embodiment, the calibration system may adjust the reference signal levels of both the transmitter and receiver circuits. The transmission medium may include an isolation barrier circuit.

The transmitter circuit may include a digital to analog circuit with an analog output coupled to the isolation barrier circuit and an input for receiving a digital input signal to be communicated across the isolation barrier circuit and the receiver circuit may include an analog to digital circuit having an analog input signal coupled to the isolation barrier circuit for providing a digital output signal. The digital to analog circuit may include a digital to analog converter with an input for receiving the input signal and a modulation circuit responsive to the digital to analog converter for providing the analog output. The digital to analog circuit may include an encoder circuit responsive to the digital input signal to produce a digital signal and a digital to analog converter responsive to the digital signal to provide the analog output to the isolation barrier circuit. The analog to digital circuit may include an analog to digital converter responsive to the analog input signal to provide a digital signal and a decoder circuit responsive to the digital signal to provide the digital output signal. The analog to digital circuit may include a demodulator circuit responsive to the analog output to provide an analog signal and an analog to digital converter responsive to the analog signal to provide the digital output signal.

The communication system may be a bi-directional signal transfer system. The calibration system may include a first digital to analog circuit and a first analog to digital circuit coupled to the first side of the isolation barrier circuit and second digital to analog circuit and second analog to digital circuit coupled to the second side of the isolation barrier circuit such that the first digital to analog circuit transmits to the second analog to digital circuit and the second digital to analog circuit transmits to the first digital to analog circuit.

The communication system may be a simultaneous signal transfer system. The calibration system may include a first echo cancellation system, producing a first echo cancellation signal coupled to the first analog to digital circuit to remove the analog output of the first digital to analog circuit from the input of the first analog to digital circuit, a first echo cancellation calibration circuit responsive to the altered reference signal of the first digital to analog circuit to adjust the first echo cancellation signal, a second echo cancellation system coupled to the second analog to digital circuit to remove the analog output of the second digital to analog circuit from the input of the second analog to digital circuit and a second echo cancellation calibration circuit responsive to the altered reference signal of the second digital to analog circuit to adjust the second echo cancellation signal. The echo cancellation signals may be derived from the analog outputs of the digital to analog circuits. The echo cancellation signals may be separately generated based on the digital input signals and on the digital output signals of the first and second analog to digital circuits or on the altered reference signals of the first and second digital to analog circuits. The echo cancellation circuits may include digital to analog converters with an input connected to the first and second digital input signals, respectively.

The calibration system may include a control circuit coupled to the transmission medium for synchronizing the adjustment of the reference signal level. The control circuit may include a clock circuit or a control channel.

The analog output from the transmitter circuit may be a constant average signal. The analog input to the receiver circuit may be a constant average signal.

In yet another preferred embodiment, the calibration circuit may include a reference signal capture circuit for capturing a altered reference signal and providing the altered reference signal to the receiver circuit to compensate for variations in the transmission signal due to the transfer function. There may also be a reference signal averaging circuit connected to the reference signal capture circuit for averaging the altered reference signal and providing an averaged altered reference signal to the receiver circuit. The calibration system may also include first and second calibration circuits, each of which includes a reference signal capture circuit. There may also be a reference signal averaging circuit for each of the first and second calibration circuits.

BRIEF DESCRIPTION OF THE DRAWINGS

Other objects, features and advantages will occur to those skilled in the art from the following description of a preferred embodiment and the accompanying drawings, wherein like items in subsequent figures are identified with the same item number with, for example, ', ", a, or b added, in which.

DESCRIPTION OF THE PREFERRED EMBODIMENTS

Figure 1:
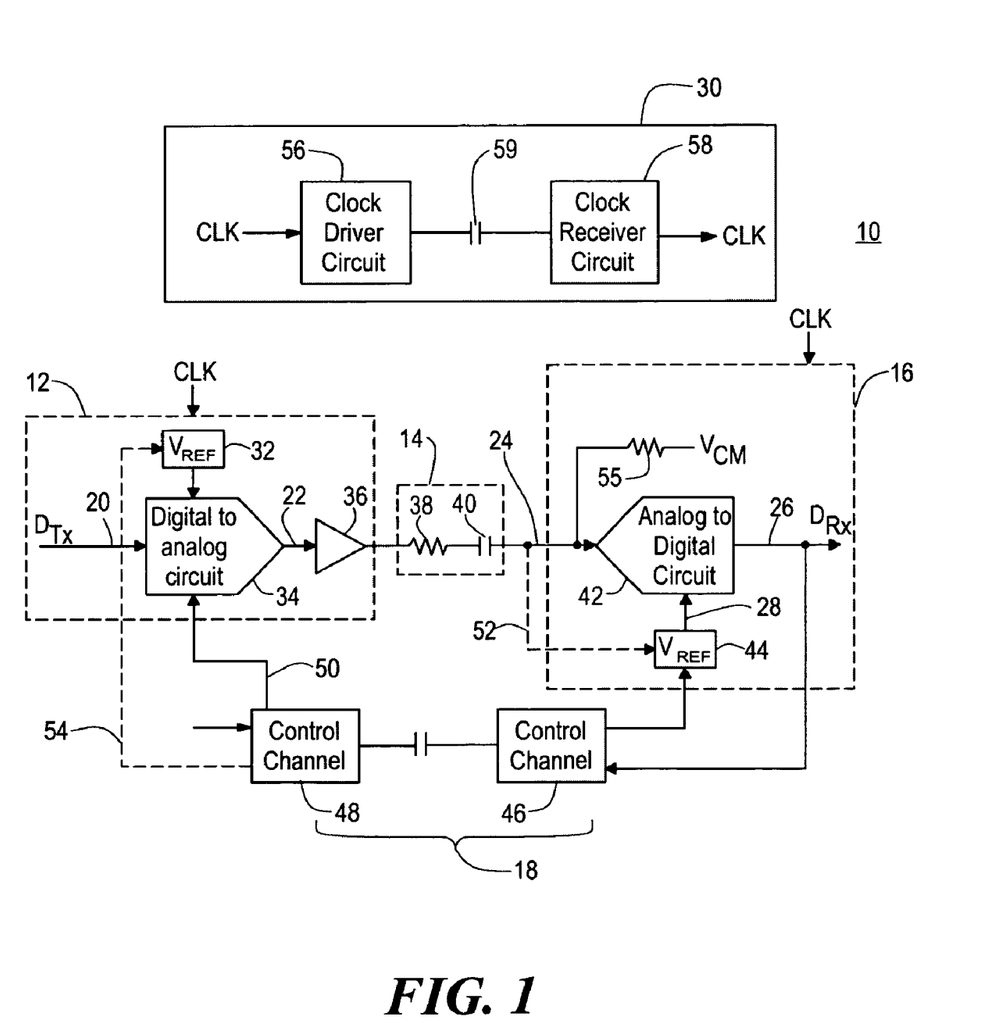
FIG. 1 is a schematic drawing of a calibration system for a uni-directional communications system according to the present invention.

A communications system 10, FIG. 1 according to the present invention, includes transmitter circuit 12, transmission medium 14, receiver circuit 16, and calibration system 18. Communications system 10 is a unidirectional system. Transmitter circuit 12 takes a digital input 20, converts it to analog signal 22 which is transmitted through transmission medium 14. Analog signal 24, which is signal 22 altered by the transfer function of transmission medium 14, is converted by receiver circuit 16 to produce digital output 26. Termination resistance 55 is included to reduce common mode error.

There may be a control circuit 30, shown as a clock circuit with clock driver circuit 56 connected through isolation barrier circuit 59, to clock receiver circuit 58, to synchronize the operation of the communications system. Transmitter circuit 12 may include digital to analog circuit 34, voltage reference circuit 32 and amplifier circuit 36. Any suitable digital to analog circuit 34 may be advantageously used, for example, a digital to analog converter. Receiver circuit 16 may include analog to digital circuit 42, and voltage reference circuit 44. Any suitable analog to digital circuit 42 may be advantageously used, for example, an analog to digital converter.

The transfer function of transmission medium 14 depends on the components which are part of transmission medium 14. Although transmission medium 14 is shown as a resistor 38 and capacitor 40, there may be additional resistances, capacitances and/or impedances which make up transmission medium 14. Some of these capacitances or impedances may be parasitic in nature, i.e., they result from various manufacturing anomalies in the circuitry, for example, circuit boards and other components, which are part of transmission medium 14. Because of the nature of these unknown capacitors as well as mismatches of components used in transmission medium 14, the transfer function of transmission medium 14 is unpredictable. In other words, it is not predictable how the transmission signal from transmitter circuit 12 will be altered by the transfer function before it is received by receiver circuit 16. This unpredictable gain of the transfer function can result in data transmission errors. The sensitivity to the unpredictable gain increases as the resolution of the circuits 34 and 42 increases.

To compensate for this unpredictable transfer function, calibration system 18, which may include control channels 46 and 48, and voltage reference circuit 44, operates to adjust the reference voltage level 28 of receiver circuit 16 based upon the altered reference signal of transmitter circuit 12 which is received by receiver circuit 16 during a calibration cycle. In operation during a calibration cycle, transmitter circuit 12 sends a predefined signal through transmission medium 14. Typically, in a preferred embodiment, the predefined signal would be a full scale signal. This predefined signal is altered by the transfer function of transmission medium 14 before being received by receiver circuit 16. Digital output 26 is used by calibration system 18 to adjust reference signal level 28 supplied to receiver circuit 16 by voltage reference circuit 44. In another embodiment, calibration system 18 uses analog signal 52 (shown in phantom) from transmission medium 14 to adjust reference signal level 28.

In yet another embodiment, calibration system 18 may adjust the reference signal level of transmitter circuit 12 through signal 54 (shown in phantom) coupled to voltage reference circuit 32 to adjust the reference signal level of digital to analog circuit 34. In operation, this may be necessary if calibration system 18 could no longer adjust the reference signal level of receiver circuit 16 because the maximum or minimum value of that reference signal had been reached. Calibration system 18 would recognize this event and adjust the reference signal level of transmitter circuit 12 to allow for appropriate adjustment of the reference signal level of receiver circuit 16. Also, in another embodiment, calibration system 18 may adjust only the reference signal level of transmitter circuit 12. The calibration system of these embodiments perform receive calibration.

Figure 2:
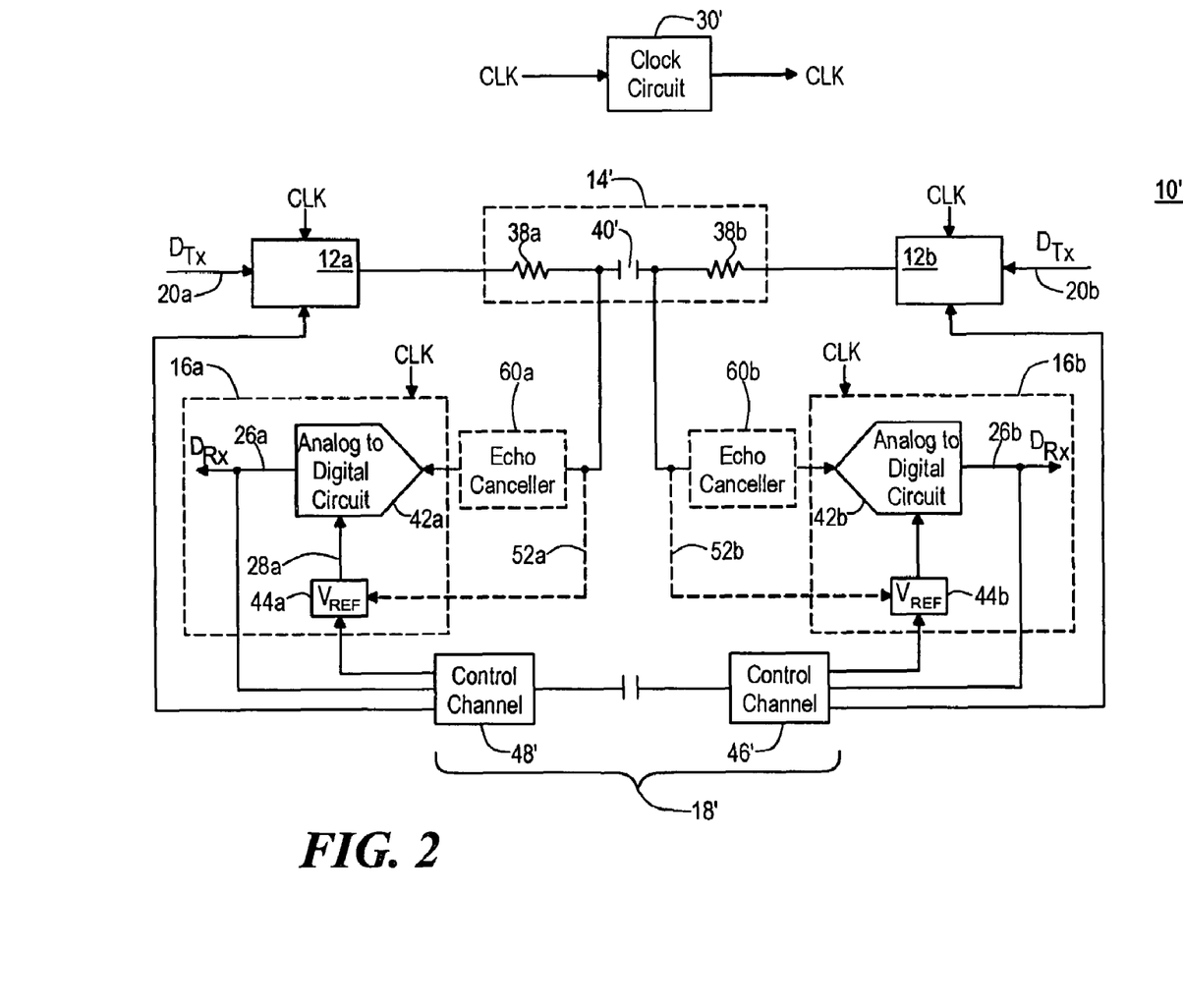
FIG. 2 is a schematic drawing of a calibration system for a bi-directional communications system according to the present invention.

A bi-directional communication system 10', FIG. 2, includes two transmitter circuits 12a, 12b, transmission medium 14', two receiver circuits 16a, 16b, and calibration circuit 18'. In operation, communications system 10' transmits, on one clock cycle, digital input 20a into transmitter circuit 12a to receiver circuit 16b which provides digital output 26b and, on another clock cycle, digital input 20b into transmitter circuit 12b to receiver circuit 16a which provides digital output 26a.

In this embodiment, calibration system 18' adjusts the reference signal level of receiver circuits 16a and 16b based upon the altered reference signal of transmitter circuits 12b and 12a, respectively. As in FIG. 1, during a calibration cycle (or cycles), calibration system 18' uses the digital outputs 26a, 26b of the receiver circuits 16a, 16b to adjust the reference signal levels 28a, 28b. In another embodiment, calibration system 18' adjusts reference signal levels 28a, 28b using analog signals 52a, 52b (shown in phantom) from transmission medium 14'.

If communication system 10' transmits simultaneously, transmitter circuits 12a, 12b simultaneously transmit to receiver circuits 16b, 16a, respectively. This simultaneous transmission further complicates the communication system as a local echo, or reflected, signal from transmitter circuit 12a may be coupled to receiver circuit 16a (or from transmitter circuit 12b to receiver circuit 16b), resulting in potential data transmission errors. To eliminate the local echo signals, echo cancellation circuits 60a, 60b (shown in phantom) may be used.

In general, the echo cancellation circuits of the present invention operate as follows. When the communication system is bi-directional and simultaneous, each receiver circuit will receive inputs which include the transmitted signal from the transmitter circuit on the far side of the isolation barrier as well as a local echo of the signal transmitted from the near side transmitter circuit. The echo cancellation circuits, when properly calibrated, subtract out the local echo of the near side signal so that each receiver circuit is receiving only the transmitted signal from the far side of the isolation barrier.

Figure 3:
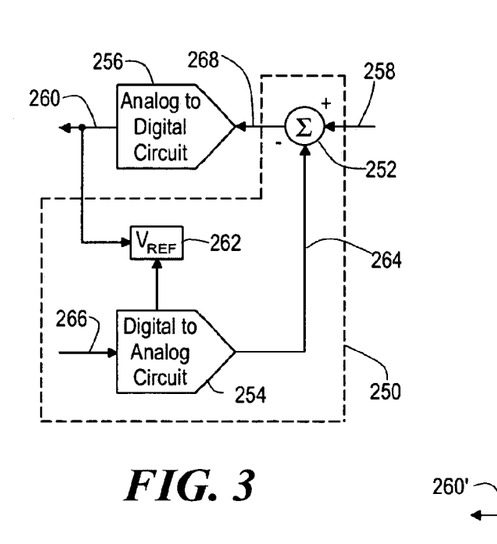
FIGS. 3-5 are schematic drawings of three embodiments of an echo cancellation circuit according to the present invention.
Figure 4:
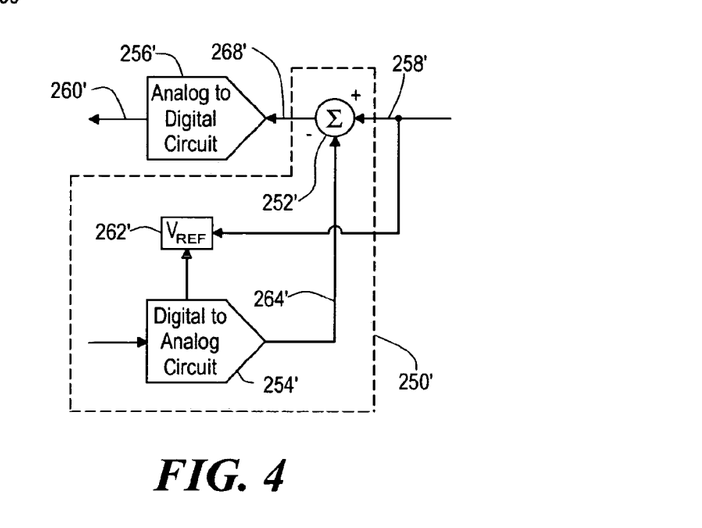
Figure 5:
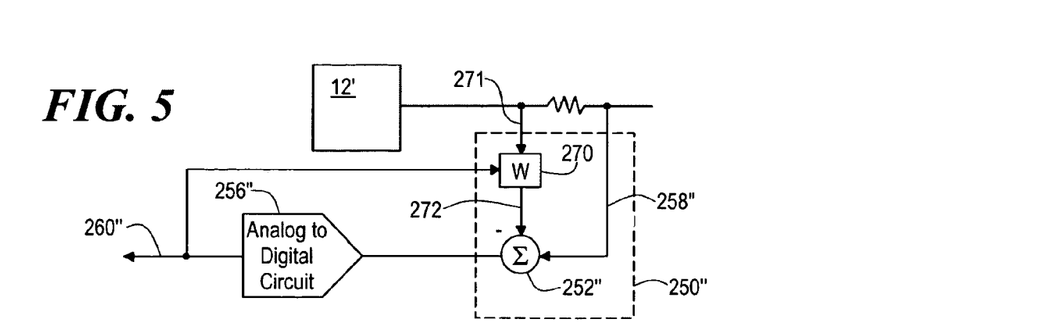

Examples of echo cancellation circuits 60a, 60b, FIG. 2 are shown in FIGS. 3-5. Echo cancellation circuit 250, FIG. 3, includes summing node 252 connected between digital to analog circuit 254 and receive analog to digital circuit 256. During a calibration cycle of echo cancellation circuit 250, there is no transmission from the far side of the isolation barrier. Therefore, the only signal present on line 258 is the local echo of the near side transmitter circuit. The output 260 of analog to digital circuit 256 is then used to adjust reference voltage 262 of digital to analog circuit 254 until output 264 of digital to analog circuit 254 is equal to local echo signal 258, thus canceling out the local echo signal. Input 266 of digital to analog circuit 254 is equivalent to the signal to be transmitted, such as 20a or 20b, FIG. 2.

In another embodiment, echo cancellation circuit 250', FIG. 4, includes summing circuit 252', digital to analog circuit 254' and voltage reference 262'. During an echo cancellation calibration cycle, voltage reference 262' captures the value of the local echo signal present on line 258', adjusting the output 264' of digital to analog circuit 254' to be equal to local echo signal 258', thus canceling out the local echo signal through summing circuit 252'.

In another embodiment, echo cancellation circuit 250", FIG. 5, includes summing node 252" and weighting circuit 270. During an echo cancellation calibration cycle, weighting circuit 270 receives analog output 271" from transmitter circuit 12' and digital output 260" from analog to digital circuit 256" and adjusts echo cancellation signal 272 to cancel out the local echo from transmitter circuit 12'.

Figure 6:
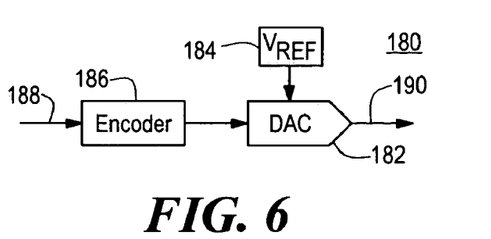
FIGS. 6 and 7 are schematic drawings two embodiments of transmitter circuits according to the present invention.
Figure 7:
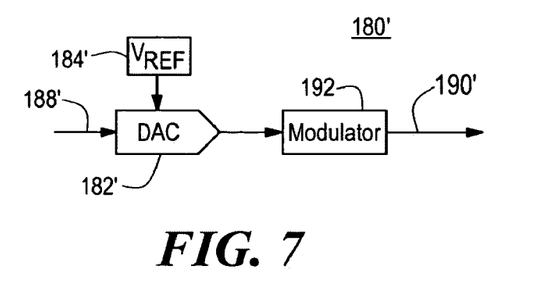

The transmitter circuits of the present invention are not limited to the digital to analog circuit shown in FIG. 1. Transmitter circuit 180, FIG. 6, includes digital to analog converter 182, reference voltage 184 and encoder 186. Digital signal 188 is converted to analog signal 190, which is connected to the transmission medium. Transmitter circuit 180', FIG. 7, includes digital to analog converter 182', reference voltage 184' and modulator 192. Digital input 188' is converted to analog signal 190'. In both of these embodiments, analog signals 190, 190' have constant signal averages because encoder 186, FIG. 6, or modulator 192, FIG. 7, respectively, function to eliminate any DC component of the respective analog signals.

Figure 8:
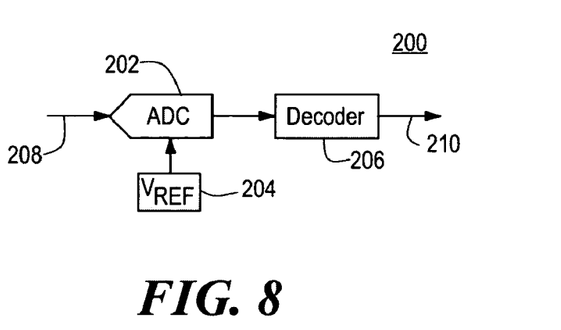
FIGS. 8 and 9 are schematic drawings of two embodiments of receiver circuits according to the present invention.
Figure 9:
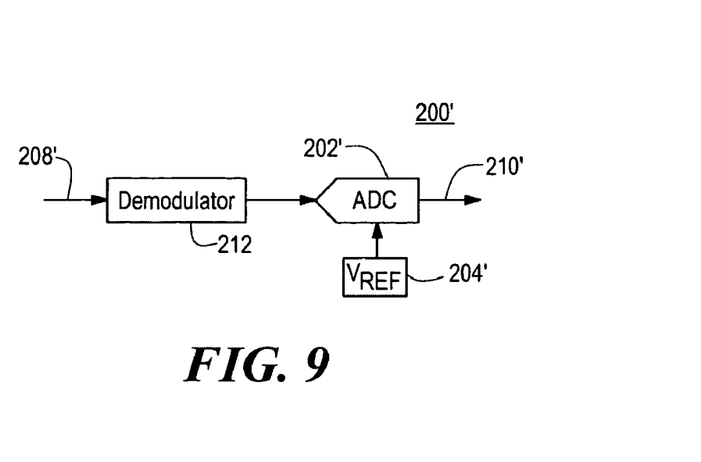

The receiver circuits of the present invention may include analog to digital circuits. Receiver circuit 200, FIG. 8, includes analog to digital converter 202, voltage reference 204 and decoder 206. Analog signal 208, which is connected to the transmission medium (not shown) is converted into digital signal 210. Receiver circuit 200', FIG. 9, includes analog to digital converter 202', voltage reference 204' and demodulator 212. Analog signal 208' is converted to digital signal 210'. Analog signals 208 and 208' have constant signal averages because no DC component is transmitted across the isolation barrier.

While not required for operation of the calibration system of the present invention, analog signals without DC components may be advantageous because DC components may adversely affect the data transmission across the isolation barrier.

Figure 10:
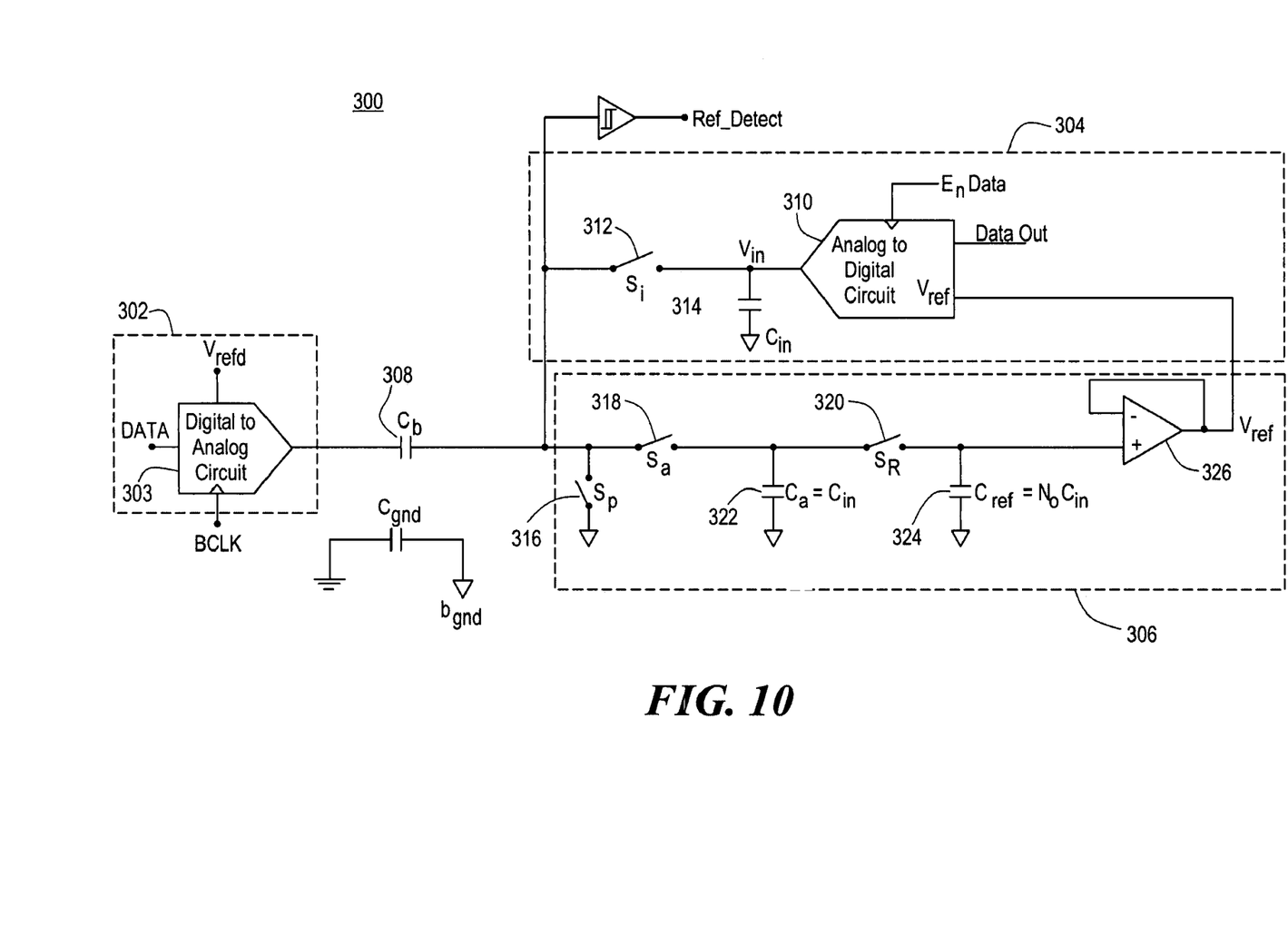
FIG. 10 is a schematic drawing of another embodiment of a calibration system according to the present invention.
Figure 11:
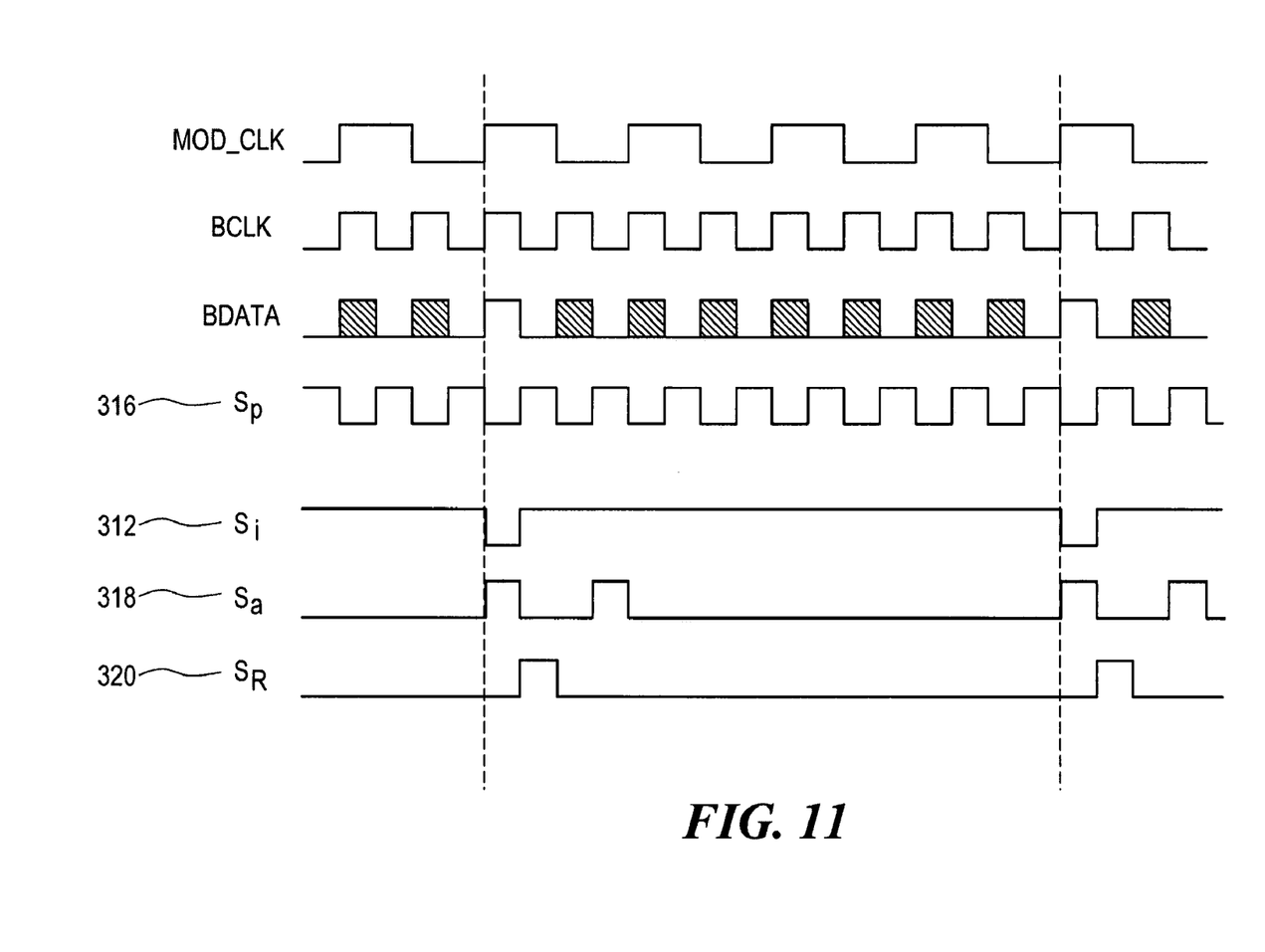
FIG. 11 is a switch timing diagram for the embodiment of FIG. 10.

In another embodiment according to the present invention, communication system 300, FIG. 10, includes transmitter circuit 302, isolation barrier 308, receiver circuit 304, and calibration circuit 306. Transmitter circuit 302 includes digital to analog circuit 303. Receiver circuit 304 includes analog to digital circuit 310, switch 312 and capacitor 314. Calibration circuit 306 includes switches 316, 318, 320, capacitors 322, 324 and buffer circuit 326. The switch timing of this circuit is shown in FIG. 11, in which a high signal indicates that the switch is closed. During a calibration cycle, the altered reference signal from the transmitter circuit is captured on capacitor 322. Subsequently, capacitors 322 and 324 are connected such that voltage sharing occurs between the two capacitors. This effectively causes capacitor 324 to capture an average altered reference signal which is then used as the reference voltage for analog to digital 310. After each voltage sharing operation, capacitor 322 is discharged to ground. The average altered reference signal represents a moving average of the altered reference signals captured in sequential calibration cycles.

Figure 12:
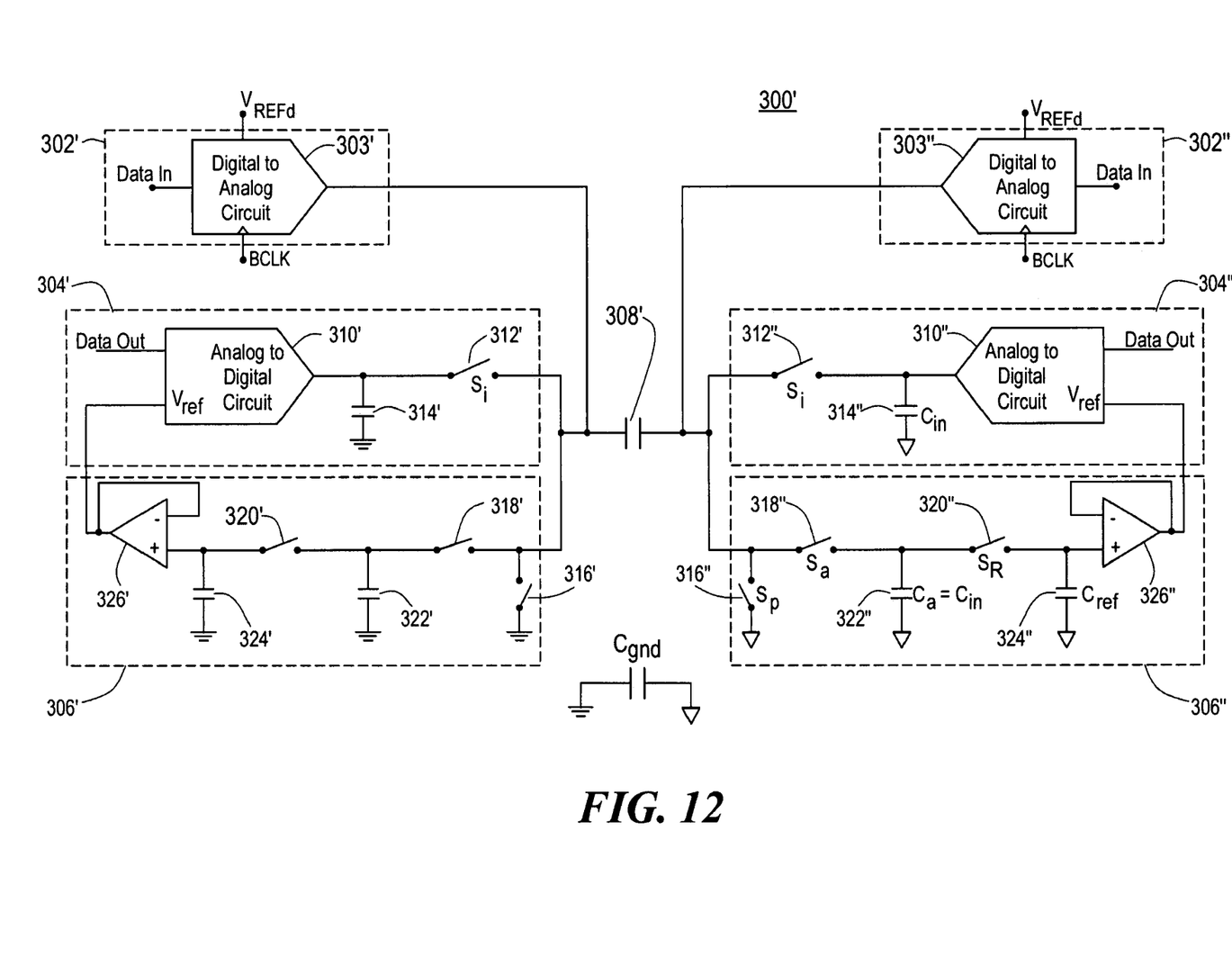
FIG. 12 is a schematic drawing of another embodiment of a calibration system for a bi-directional communications system according to the present invention.

Communication system 300', FIG. 12, is a bi-directional version of the system shown in FIG. 15. Here there are two transmitter circuits 302', 302"; two receiver circuits 304', 304";, and two calibration circuits 306', 306". In operation, one calibration circuit, 306' for example, performs a calibration cycle as described above with respect to FIG. 11 and then the other calibration circuit performs the calibration cycle. The end result of these two calibration cycles is that capacitors 324', 324" each capture the appropriate average altered reference signal for receiver circuits 302', 302", respectively. If communications system 300 is bi-directional and simultaneous, echo cancellation circuits, such as 60a, 60b, FIG. 2 may be used.

One advantage of the embodiments shown in FIGS. 10 and 12 is that these systems perform equally whether or not the analog signal transmitted across the isolation barrier circuit contains DC components.

The reference signal level and echo cancellation circuit calibration cycles have been discussed herein as discrete operations. In the case of bi-directional, simultaneous communications systems, while a first side of the receive circuitry does the reference signal calibration, the second side of the receive circuitry does the local echo cancellation calibration. This is possible because, during this calibration cycle, only one transmitter circuit is transmitting. Then, on a subsequent calibration cycle, the first side may perform the local echo cancellation calibration while the second side performs the reference signal level calibration.

Calibration cycles may be performed in numerous sequences. For example, a series of reference signal level calibration cycles may be performed on the same side of the communications system while simultaneously performing a series of echo cancellation calibration cycles of the other side of the communications systems. Or, calibration cycles may be interspersed between data transmission cycles.

While the present invention has been disclosed for amplitude encoded data communication systems, it is also applicable to frequency or phase encoded data communication systems.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A calibration system for a communication system comprising
    a transmitter circuit;
    a receiver circuit;
    a transmission medium having an unpredictable transfer function for transmitting a reference signal and a transmission signal between said transmitter and receiver circuits; and
    a calibration circuit responsive to an altered reference signal of said transmitter circuit altered by the transmission medium for adjusting the reference signal level of both said transmitter and receiver circuits to compensate for variations in the transmission signal due to said transfer function.

2. The calibration system of claim 1 in which said transmission medium includes an isolation barrier circuit.

3. The calibration system of claim 2 in which said transmitter circuit includes a digital to analog circuit having an analog output coupled to said isolation barrier circuit and an input for receiving an digital input signal to be communicated across said isolation barrier circuit and said receiver circuit includes an analog to digital circuit having an analog input coupled to the isolation barrier circuit for receiving the analog signal communicated across the isolation barrier and providing a digital output signal.

4. The calibration system of claim 3 in which said digital to analog circuit includes a digital to analog converter with an input for receiving said digital input signal and a modulation circuit responsive to said digital to analog converter for providing said analog output.

5. The calibration system of claim 3 in which said digital to analog circuit includes an encoder circuit responsive to said digital input signal to provide a digital signal, and a digital to analog converter responsive to said digital signal to provide to said isolation barrier said analog output.

6. The calibration system of claim 3 in which said calibration circuit adjusts the reference signal level of both said transmitter and receiver circuits.

7. The calibration system of claim 3 in which said analog to digital circuit includes an analog to digital converter responsive to said analog input from the isolation barrier circuit to provide a digital signal, and a decoder circuit responsive to said digital signal to provide said digital output signal.

8. The calibration system of claim 3 in which said analog to digital circuit includes a demodulator circuit responsive to said analog input from the isolation barrier circuit to provide an analog signal and an analog to digital converter responsive to said analog signal to provide said digital output signal.

9. The calibration system of claim 1 where the communication system is a bi-directional signal transfer system.

10. The calibration system of claim 9 in which said calibration circuit adjusts the reference signal level of both said transmitter and receiver circuits.

11. The calibration system of claim 9 in which said said transmission medium includes an isolation barrier circuit.

12. The calibration system of claim 11 in which said isolation barrier circuit includes at least one isolation element; said transmission circuit includes a first digital to analog circuit having an analog output coupled to a first side of the isolation barrier circuit and an input for receiving a first digital input signal to be communicated across the isolation barrier and a second digital to analog circuit having an analog output coupled to a second side of the isolation barrier circuit and an input for receiving a second digital input signal to be communicated across the isolation barrier circuit; and the receiver circuit including a first analog to digital circuit coupled to the first side of the isolation barrier circuit for receiving the analog output of the second digital to analog circuit and a second analog to digital circuit coupled to the second side of the isolation barrier circuit for receiving the analog output of the first digital to analog circuit.

13. The calibration system of claim 12 in which each of said first and second digital to analog circuits include a digital to analog converter with an input for receiving said digital input signal and a modulation circuit responsive to said digital to analog converter for providing said analog output.

14. The calibration system of claim 12 in which each of said first and second digital to analog circuits include an encoder circuit responsive to said digital input signal to provide a digital signal, and a digital to analog converter responsive to said digital signal to provide to said isolation barrier said analog output.

15. The calibration system of claim 12 in which each of said first and second analog to digital circuits include an analog to digital converter responsive to said analog input signal from the isolation barrier to provide a digital signal, and a decoder circuit responsive to said digital signal to provide said digital output signal.

16. The calibration system of claim 12 in which each of said first and second analog to digital circuits include a demodulator circuit responsive to said analog input signal from the isolation barrier to provide an analog signal and an analog to digital converter responsive to said analog signal to provide said digital output signal.

17. The calibration system of claim 12 wherein the communication system is a simultaneous signal transfer system.

18. The calibration system of claim 17 further comprising a first echo cancellation circuit, producing a first echo cancellation signal, coupled to the first analog to digital circuit to remove the analog output of the first digital to analog circuit from the input of the first analog to digital circuit, a first echo cancellation calibration circuit responsive to the altered reference signal of the first digital to analog circuit to adjust said first echo cancellation signal, a second echo cancellation circuit, producing a second echo cancellation signal, coupled to the second analog to digital circuit to remove the analog output of the second digital to analog circuit from the input of the second analog to digital circuit, and a second echo cancellation calibration circuit responsive to the altered reference signal of the second digital to analog circuit to adjust said second echo cancellation signal.

19. The calibration system of claim 18, wherein said first and second echo cancellation signals are derived from the analog outputs of said first and second digital to analog circuits, respectively.

20. The calibration system of claim 18, wherein the first echo cancellation signal is separately generated based on the first digital input signal and the second echo cancellation signal is separately generated based on the second digital input signal.

21. The calibration system of claim 20, in which each of said first and second echo cancellation circuits includes a digital to analog circuit with an input connected to said first and second digital input signals, respectively, and a voltage reference circuit, wherein said first and second echo cancellation calibration circuits adjust the voltage reference circuits based on the digital output signals of said first and second analog to digital circuits, respectively.

22. The calibration system of claim 20, in which each of said first and second echo cancellation circuits includes a digital to analog circuit with an input connected to said first and second digital input signals, respectively, and a voltage reference circuit, wherein said first and second echo cancellation calibration circuits adjust the voltage reference circuits based on the altered reference signal of said first and second digital to analog circuits, respectively.

23. The calibration system of claim 20 wherein the first echo cancellation circuit includes a digital to analog converter with an input connected to the first digital input signal and an output coupled to the input of the first analog to digital circuit and the second echo cancellation circuit includes a digital to analog converter with an input connected to the second digital input signal and an output coupled to the input of the second analog to digital circuit.

24. The calibration system of claim 1 including a control circuit coupled to the transmission medium to synchronize the adjustment of the reference signal level.

25. The calibration system of claim 24 in which the control circuit includes a clock circuit.

26. The calibration system of claim 25 in which the control circuit includes a control channel.

27. The calibration system of claim 3 in which the analog output is a constant average signal.

28. The calibration system of claim 3 in which the analog input is a constant average signal.

29. The calibration system of claim 3 wherein said calibration circuit includes a reference signal capture circuit for capturing, an altered reference signal and providing said altered reference signal to said receiver circuit, wherein said altered reference signal compensates for variations in the transmission signal due to said transfer function.

30. The calibration system of claim 29 wherein said calibration circuit includes a reference signal averaging circuit connected to said reference signal capture circuit for averaging said altered reference signal and providing an averaged altered reference signal to said receiver circuit.

31. The calibration system of claim 12 wherein said calibration circuit includes first and second calibration circuits, each of said first and second calibration circuits including a reference signal capture circuit for capturing an altered reference signal and providing said altered reference signals to said first and second receiver circuits respectively, wherein said altered reference signals compensate for variations in the transmission signals due to said transfer function.

32. The calibration system of claim 31 wherein each of said first and second calibration circuits include a reference signal averaging circuit connected to said reference signal capture circuit for averaging said altered reference signal and providing an averaged altered reference signal to said first and second receiver circuits, respectively.

33. The calibration system of claim 18 including a control circuit coupled to the transmission medium to synchronize the adjustment of the reference signal levels and the echo cancellation signals.

34. The calibration system of claim 33 in which the control circuit includes a clock circuit.

35. The calibration system of claim 34 in which the control circuit includes a channel control.

36. A calibration system for a communication system comprising
a transmitter circuit;
a receiver circuit;
a transmission medium having an unpredictable transfer function for transmitting a transmission signal between said transmitter and receiver circuits; and
a calibration circuit responsive to an altered reference signal of said transmitter circuit altered by the transmission medium for adjusting the reference signal level of both said transmitter and receiver circuits to compensate for variations in the transmission signal due to said transfer function.

37. The calibration system of claim 36 including a control circuit coupled to the transmission medium to synchronize the adjustment of the reference signal levels.

38. The calibration system of claim 37 in which the control circuit includes a clock circuit.

39. The calibration system of claim 38 in which the control circuit includes a control channel.

40. A calibration system for a communication system comprising
a transmitter circuit;
a receiver circuit;
a transmission medium having an unpredictable transfer function for transmitting a reference signal and a transmission signal between said transmitter and receiver circuits; and
a calibration circuit responsive to an altered reference signal of said transmitter circuit altered by the transmission medium for adjusting the reference signal level of said transmitter circuit to compensate for variations in the transmission signal due to said transfer function.

41. The calibration system of claim 40 in which said transmission medium includes an isolation barrier circuit.

42. The calibration system of claim 41 in which said transmitter circuit includes a digital to analog circuit having an analog output coupled to said isolation barrier circuit and an input for receiving an digital input signal to be communicated across said isolation barrier circuit and said receiver circuit includes an analog to digital circuit having an analog input coupled to the isolation barrier circuit for receiving the analog signal communicated across the isolation barrier and providing a digital output signal.

43. The calibration system of claim 40 including a control circuit coupled to the transmission medium to synchronize the adjustment of the reference signal level.

* * * * *